United States Patent
Takahata

(10) Patent No.: US 9,133,657 B2
(45) Date of Patent: Sep. 15, 2015

(54) COVER OPENING-CLOSING MECHANISM AND SHEET FEEDER HAVING THE SAME

(71) Applicant: Muneaki Takahata, Toyoake (JP)

(72) Inventor: Muneaki Takahata, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/934,394

(22) Filed: Jul. 3, 2013

(65) Prior Publication Data

US 2014/0008865 A1 Jan. 9, 2014

(30) Foreign Application Priority Data

Jul. 6, 2012 (JP) ................................. 2012-153074

(51) Int. Cl.
| | |
|---|---|
| B65H 1/00 | (2006.01) |
| E06B 3/38 | (2006.01) |
| B65H 5/00 | (2006.01) |
| B65H 5/06 | (2006.01) |
| H04N 1/00 | (2006.01) |

(52) U.S. Cl.
CPC .. *E06B 3/38* (2013.01); *B65H 5/00* (2013.01); *B65H 5/068* (2013.01); *H04N 1/00551* (2013.01); *B65H 2402/441* (2013.01); *B65H 2402/442* (2013.01); *B65H 2402/45* (2013.01); *B65H 2402/64* (2013.01); *B65H 2405/115* (2013.01); *B65H 2407/20* (2013.01); *B65H 2601/11* (2013.01); *B65H 2801/39* (2013.01)

(58) Field of Classification Search
CPC ..................... B65H 2405/115; B65H 2407/33; B65H 2402/441; B65H 2402/442; B65H 2402/45
USPC ....................................................... 271/145
See application file for complete search history.

(56) References Cited

U.S. PATENT DOCUMENTS

| | | | | |
|---|---|---|---|---|
| 6,075,958 | A * | 6/2000 | Gotoh et al. ................... | 399/124 |
| 2011/0158680 | A1* | 6/2011 | Koiwai ........................... | 399/110 |
| 2012/0155916 | A1* | 6/2012 | Ito et al. ......................... | 399/110 |

FOREIGN PATENT DOCUMENTS

| | | |
|---|---|---|
| JP | 10-145514 | 5/1998 |
| JP | 10-148926 | 6/1998 |
| JP | 11-341204 | 12/1999 |

\* cited by examiner

*Primary Examiner* — Howard Sanders
(74) *Attorney, Agent, or Firm* — Banner & Witcoff, Ltd.

(57) ABSTRACT

A cover opening-closing mechanism is provided, which is configured to allow a cover to rotate around a rotational axis with respect to a housing, the cover opening-closing mechanism including a connecting member configured to connect the housing with the cover, a first contact portion disposed at the cover, and a second contact portion disposed at the housing, the second contact portion configured to contact the first contact portion of the cover so as to hold the cover in a hold position relative to the housing.

14 Claims, 8 Drawing Sheets

COVER OPENING-CLOSING MECHANISM AND SHEET FEEDER HAVING THE SAME

CROSS-REFERENCE TO RELATED APPLICATION

This application claims priority under 35 U.S.C. §119 from Japanese Patent Application No. 2012-153074 filed on Jul. 6, 2012. The entire subject matter of the application is incorporated herein by reference.

BACKGROUND

1. Technical Field

The following description relates to one or more techniques for a cover opening-closing mechanism configured to allow a cover to rotate with respective to a housing and a sheet feeder configured to feed a sheet.

2. Related Art

An image reading unit, provided to an apparatus such as an image scanner and a multi-function peripheral (MFP), has been known which includes an automatic document feeder (ADF) configured to automatically feed a document sheet to an apparatus main body.

The ADF includes, in a housing thereof, a sheet conveyance path for conveying a sheet. Further, the ADF includes a cover for maintenance. The cover is supported by the housing via a rotational shaft, so as to rotate around the rotational shaft between an open position to expose the sheet conveyance path and a closed position to shade and protect the sheet conveyance path. For example, when a sheet jam is caused on the sheet conveyance path, it is possible to manage the sheet jam by opening the cover to expose the sheet conveyance path.

At this time, when the cover is excessively opened, an excessive load is applied to the cover and the housing, and the cover and the housing might be damaged.

To prevent such damages, a belt-shaped stopper has been proposed of which an end and a different end are fixedly attached to the housing and the cover, respectively. Thereby, the housing and the cover are connected with each other via the stopper, such that a rotatable range of the cover with respect to the housing is restricted. Therefore, it is possible to prevent the cover from being excessively opened and to avoid the damages of the cover and the housing.

SUMMARY

The stopper is employed as a holder as well, which is configured to hold, when the cover is opened into a predetermined open position, the cover in the predetermined open position. However, since the stopper is employed as the holder as well, a load due to a weight of the cover is applied to the stopper. Hence, it causes a problem that the stopper is likely to fatigue. Moreover, when the stopper receives an excessive load, the stopper might be broken.

Aspects of the present invention are advantageous to provide one or more improved techniques, for a cover opening-closing mechanism, which make it possible to reduce fatigue of a connecting member for connecting a cover and a housing.

According to aspects of the present invention, a cover opening-closing mechanism is provided, which is configured to allow a cover to rotate around a rotational axis with respect to a housing, the cover opening-closing mechanism including a connecting member configured to connect the housing with the cover, a first contact portion disposed at the cover, and a second contact portion disposed at the housing, the second contact portion configured to contact the first contact portion of the cover so as to hold the cover in a hold position relative to the housing.

According to aspects of the present invention, further provided is a cover opening-closing mechanism that includes a rotational shaft extending along an axis line, the rotational shaft disposed at one of a cover and a housing, a shaft supporter disposed at a different one of the cover and the housing, the shaft supporter configured to support the rotational shaft so as to allow the cover to rotate around the axis line with respect to the housing, a first contact portion disposed at the cover, a second contact portion disposed at the housing, the second contact portion configured to contact the first contact portion of the cover so as to hold the cover in a hold position relative to the housing, and a connecting member configured to connect the housing with the cover so as to restrict a rotatable range of the cover with respect to the housing, the connecting member including a bendable portion configured to be bent when the cover is in the hold position relative to the housing and to be linearly stretched when the cover is further opened to an open position from the hold position relative to the housing.

According to aspects of the present invention, further provided is a sheet feeder that includes a sheet feeding mechanism configured to feed and convey a sheet through a sheet conveyance path, a housing configured to accommodate the sheet feeding mechanism, a cover, and a cover opening-closing mechanism configured to allow the cover to rotate around a rotational axis with respect to the housing, the cover opening-closing mechanism including a connecting member configured to connect the housing with the cover, a first contact portion disposed at the cover, and a second contact portion disposed at the housing, the second contact portion configured to contact the first contact portion of the cover so as to hold the cover in a hold position relative to the housing.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described in detail with reference to the accompanying drawings.

Figure 1:
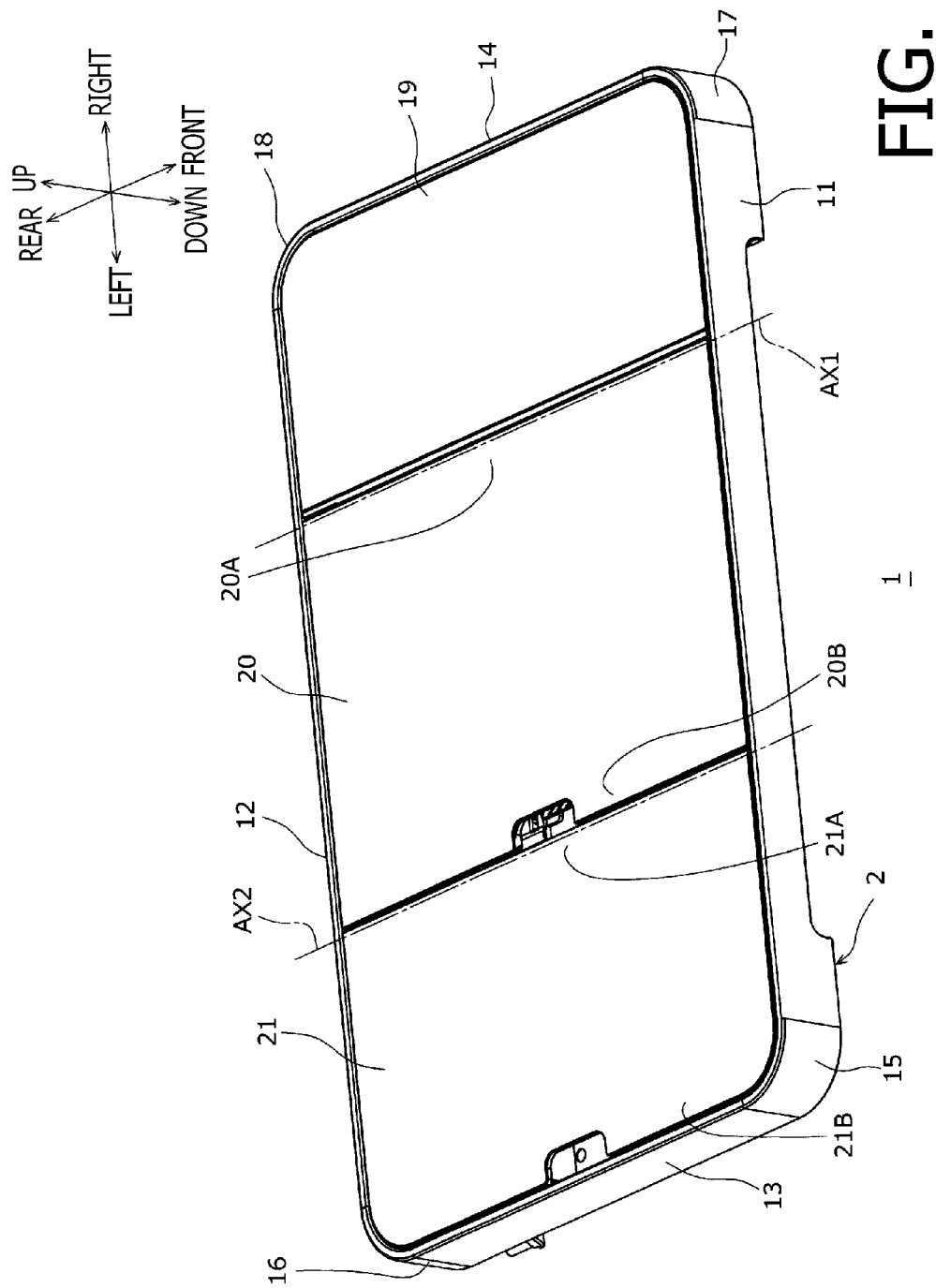
FIG. 1 is a perspective view, from an upper left front side, of a sheet feeder in a state where a tray and a maintenance cover are closed in an embodiment according to one or more aspects of the present invention.

<External Configuration of Sheet Feeder>
As shown in FIG. 1, a sheet feeder 1 is formed substantially in a flattened cuboid shape. The sheet feeder 1 is an automatic document feeder (ADF) 202. The sheet feeder 1 includes an image sensor (not shown). The sheet feeder 1 is configured to feed a sheet and read an image of the sheet by the image sensor. The sheet feeder 1 is attached onto a flatbed-type image reader (not shown).

It is noted that, in the following descriptions, a left-to-right direction, a front-to-rear direction, and a vertical direction for the sheet feeder 1, in a state placed on a horizontal surface, will be defined as shown in FIG. 1. The left-to-right direction is substantially coincident to a sheet conveyance direction. The front-to-rear direction is substantially coincidence to rotational axis directions of a maintenance cover 21 and a tray 20. The vertical direction is substantially coincident to a direction perpendicular to the sheet conveyance direction and the rotational axis directions of the maintenance cover 21 and the tray 20.

The sheet feeder 1 is provided with a housing 2.

The housing 2 includes a front plate 11, a rear plate 12, a left plate 13, and a right plate 14.

The front plate 11 and the rear plate 12 are formed substantially in rectangular plate shapes having a longitudinal direction along the left-to-right direction, respectively. The front plate 11 and the rear plate 12 are disposed to in parallel with a gap therebetween in the front-to-rear direction.

The left plate 13 is formed substantially in a rectangular plate shape extending in the front-to-rear direction. A front end of the left plate 13 is connected with a left end of the front plate 11 via a joint portion 15, which is formed in an arc shape when viewed from above. A rear end of the left plate 13 is connected with a left end of the rear plate 12 via a joint portion 16, which is formed in an arc shape when viewed from above.

The right plate 14 is formed substantially in a rectangular plate shape extending in the front-to-rear direction. A front end of the right plate 13 is connected with a right end of the front plate 11 via a joint portion 17, which is formed in an arc shape when viewed from above. A rear end of the right plate 14 is connected with a right end of the rear plate 12 via a joint portion 18, which is formed in an arc shape when viewed from above.

An upper plate 19 is disposed to extend between respective upper ends of right end portions of the front plate 11 and the rear plate 12. The upper plate 19 is formed substantially in a rectangular plate shape.

Figure 2:
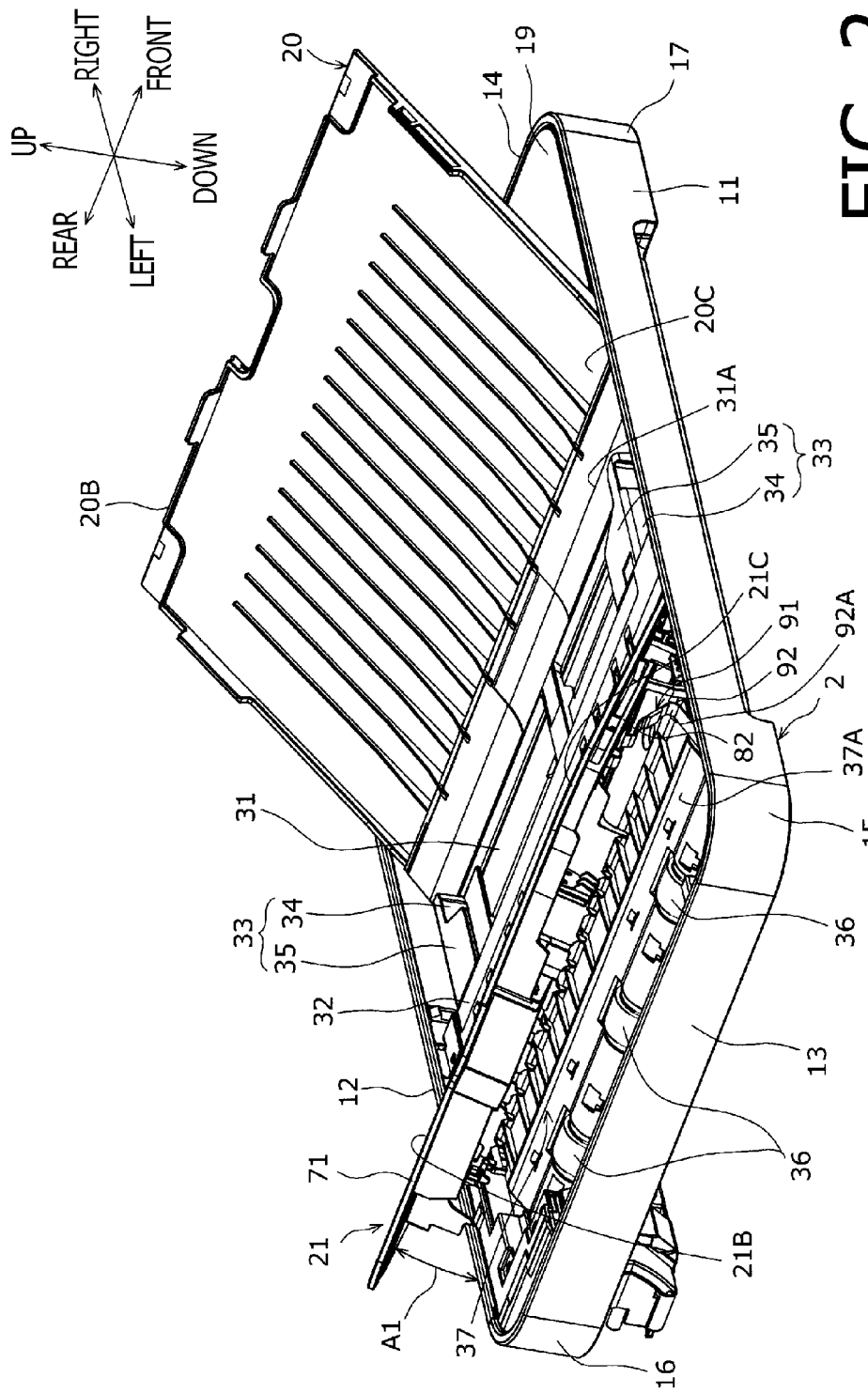
FIG. 2 is a perspective view, from the upper left front side, of the sheet feeder in a state where the tray and the maintenance cover are open in the embodiment according to one or more aspects of the present invention.

The tray 20 is disposed between respective middle portions of the front plate 11 and the rear plate 12 in the left-to-right direction. The tray 20 is formed substantially in a rectangular shape when viewed from above. The tray 20 is disposed to be rotatable between an unused position and a used position around an axis line AX1 extending a right end 20A of the tray 20. When the tray 20 is in the unused position, an outer surface of the tray 20 is on the same level as an upper surface of the upper plate 19. When the tray 20 is moved from the unused position to the used position, a left end 20B of the tray 20 in the unused position is lifted and rotated rightward (clockwise in FIG. 1). As shown in FIG. 2, the tray 20 in the used position extends in a manner inclined to become higher rightward.

The maintenance cover 21 is disposed between respective left end portions of the front plate 11 and the rear plate 12. The maintenance cover 21 is formed substantially in a rectangular shape when viewed from above. The maintenance cover 21 is configured to rotate around an axis line AX2 extending along a right end 21A of the maintenance cover 21, so as to be opened and closed. An outer surface of the maintenance cover 21 in a closed state is on the same level as the upper surfaces of the upper plate 19 and the tray 20. The maintenance cover 21 in an open state extends in a manner inclined to become higher leftward, with a left end 21B of the maintenance cover 21 lifted upward.

<Configuration for Sheet Feeding>
As shown in FIG. 2, the tray 20 includes a supply section 31 and an ejection section 32. The supply section 31 and the ejection section 32 are exposed to an outside of the sheet feeder 1 when the tray 20 is in the used position.

The supply section 31 is disposed under the ejection section 32. A right end 31A of an upper surface of the supply section 31 is gradually curved and inclined to become higher rightward. Further, the right end 31A of the upper surface of the supply section 31 is connected with a lower end 20C of an inner surface of the tray 20 in the used position, with a small gap therebetween.

The supply section 31 includes two sheet width guides 33. The two sheet width guides 33 face each other in the front-to-rear direction. Each sheet width guide 33 includes a restriction portion 34 and an extension 35. The restriction portion 34 extends upward in the vertical direction with respect to the upper surface of the supply section 253. The extension 35 extends inward in the front-to-rear direction from an upper end of the restriction portion 34. The two sheet width guides 33 are configured to concurrently move by the same distance with respect to a center therebetween so as to get close to and away from each other.

The ejection section 32 is disposed above the supply section 31 with a gap therebetween. The ejection section 32 is formed substantially in a rectangular shape extending in the left-to-right direction.

The sheet feeder 1 includes three LF rollers 36. The three LF rollers 36 are exposed to the outside of the sheet feeder 1 when the maintenance cover 21 is open. The three LF rollers 36 are supported by a shaft (not shown) extending in the front-to-rear direction and arranged at intervals along the front-to-rear direction. The shaft of the three LF rollers 36 is rotatably held by the housing 2.

A conveyance path 37 is formed between an inner surface of the maintenance cover 21 and an upper surface of a guide member 37A. The guide member 37A includes a rib 37AA provided on a front surface of the guide member 37A.

When the sheet feeder 1 is used to feed a sheet, the two sheet width guides 33 are moved (adjusted) in such a manner that a width (distance) therebetween fits a width of the sheet. Then, the sheet is inserted from a right side into an area defined between the two sheet width guides 33, and is placed to straddle the supply section 31 and the tray 20 on the basis of the center between the two sheet width guides 33.

The sheet, placed on the supply section 31 and the tray 20, is pulled leftward out of the supply section 31 and fed toward a lower side of the LF rollers 36 by a pickup roller (not shown). Afterward, the sheet is conveyed along circumferential surfaces of the LF rollers 36 and turned around in such a manner that a conveyance direction thereof is changed from a leftward direction to a rightward direction. Then, the sheet is conveyed rightward on the guide member 37A and ejected onto the ejection section 32. A right end of the sheet passes over the ejection section 32 and is placed on the extensions 35 or the tray 20. A left end of the sheet is left on the ejection section 32 and placed on the extensions 35 or the ejection section 32. It is noted that, owing to the extensions 35 of the sheet width guides 33 above a sheet set on the supply section 31, the sheet to be fed, which is placed to straddle the supply section 31 and the tray 20, is separated in a favorable manner from an ejected sheet placed to straddle the ejection section 32 and the tray 20.

<Configuration in Housing>

The housing 2 includes a bottom plate 41, a rotational shaft stand 42, rotational shaft portions 43 and 44, an opening-closing restriction portion 51, a restriction projection 52, a first base stand 61, a protrusion 62, a screw hole 63, a supporting stand 64, a second base stand 65, a through hole 66, and wall portions 67 and 68. The housing 2 is made of polystyrene.

The bottom plate 41 is a single-piece product made by integral molding of resin. The bottom plate 41 is configured to close from beneath a space surrounded by the front plate 11, the rear plate 12, the left plate 13, and the right plate 14.

Figure 4:
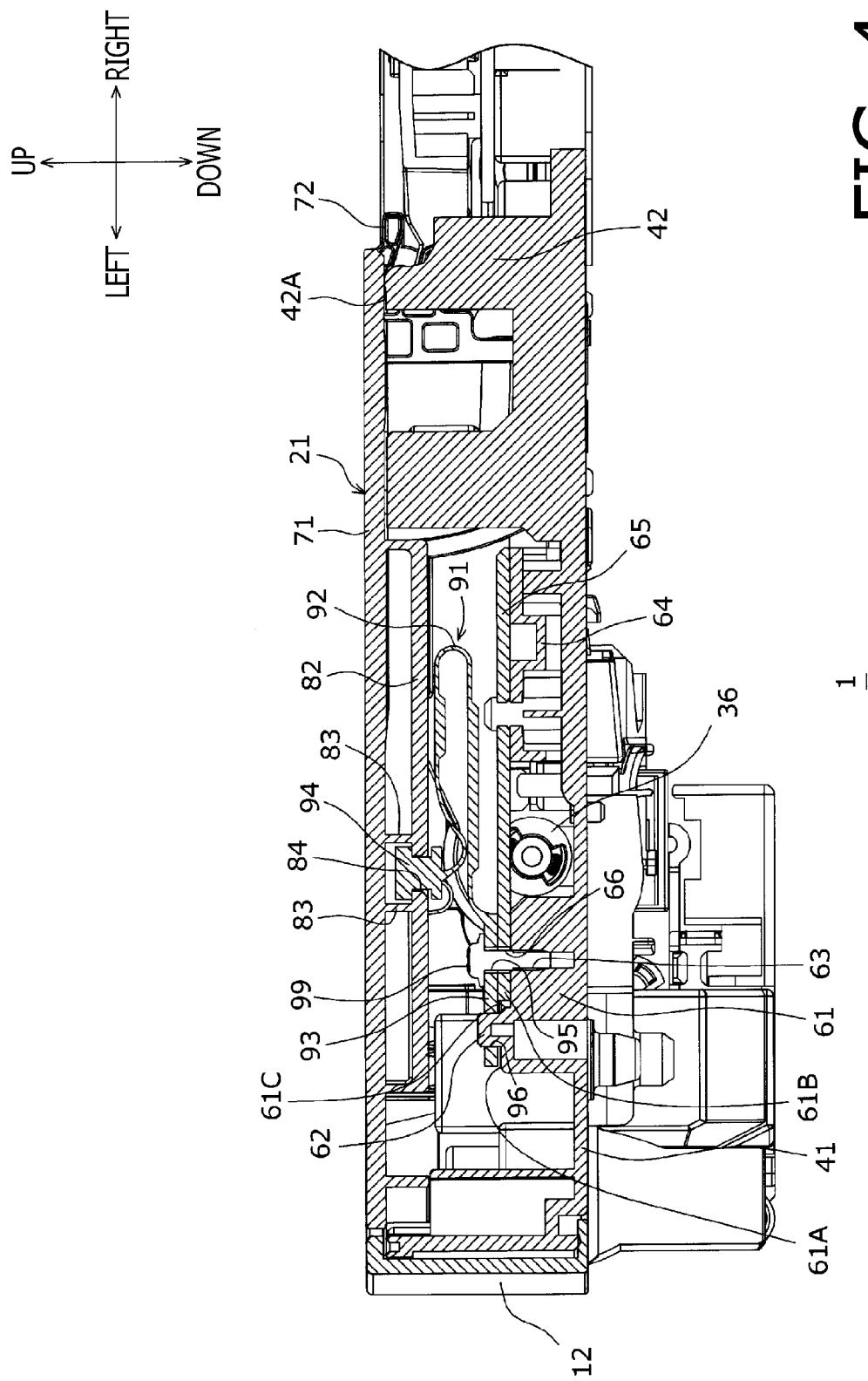
FIG. 4 is a cross-sectional front view of the sheet feeder taken along a line A-A shown in FIG. 3 in the embodiment according to one or more aspects of the present invention.

The rotational shaft stand 42 is disposed in front of the guide member 37A, on the bottom plate 41. As shown in FIG. 4, the rotational shaft stand 42 is formed integrally with the bottom plate 41. The rotational shaft 42 is formed substantially in a cuboid shape extending upward from the bottom plate 41.

The rotational shaft portion 43 extends rearward at an upper end of the rotational shaft stand 42. The rotational shaft portion 43 protrudes further rearward than a rear surface of the rotational shaft stand 42. The rotational shaft portion 43 is formed integrally with the rotational shaft stand 42.

The rotational shaft portion 44 is disposed to face the rotational shaft portion 43 in the front-to-rear direction, between the rear plate 12 and the guide member 37A. The rotational shaft portion 44 is disposed at an upper end of a shaft supporting portion 45 extending upward from the bottom plate 41. The rotational shaft portion 44 is formed integrally with the shaft supporting portion 45. The rotational shaft portion 44 extends in the front-to-rear direction, so as to have the axis line AX2 as its own axis line in common with the rotational shaft portion 43.

Figure 3:
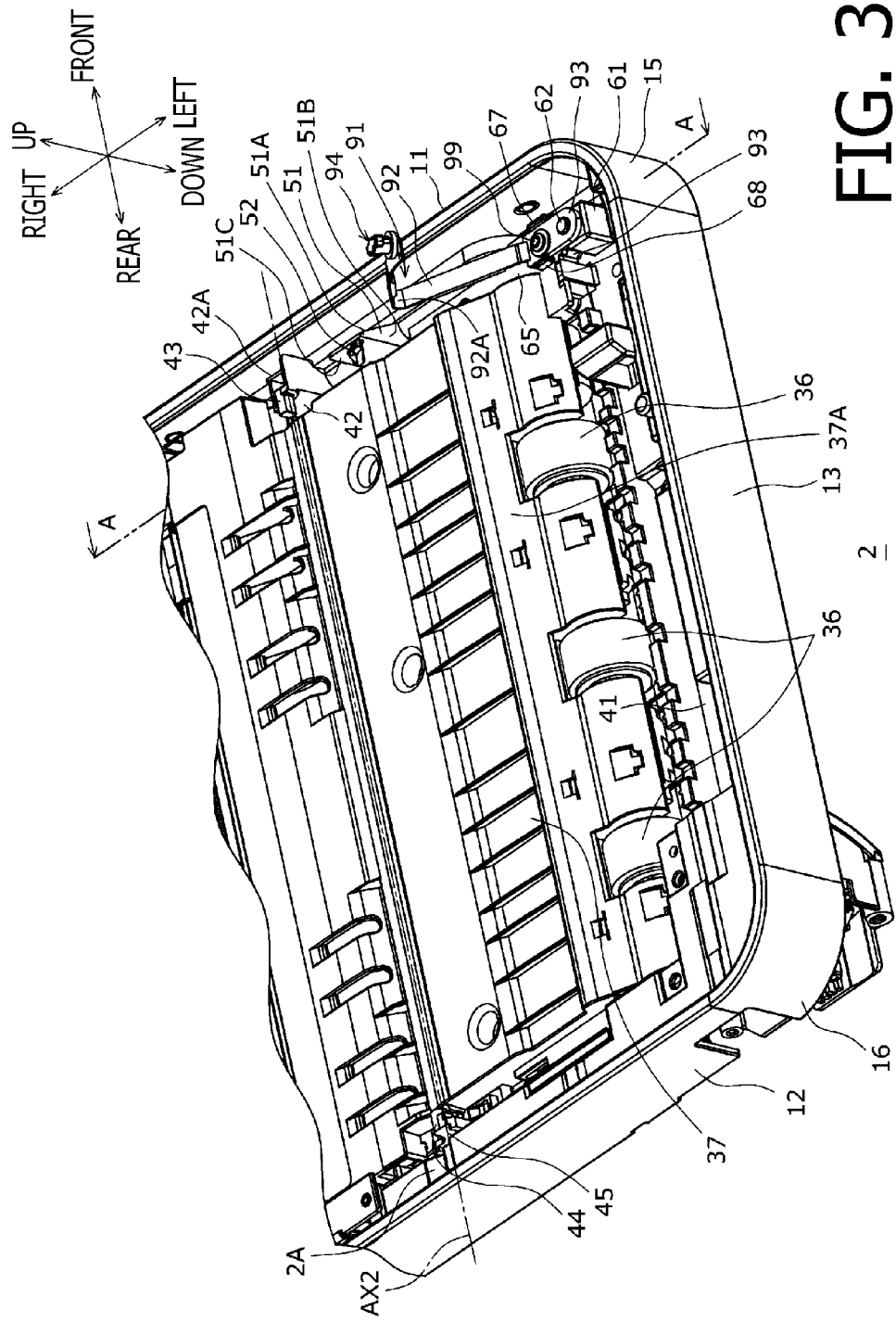
FIG. 3 is a perspective view, from an upper left rear side, of a left end portion of the sheet feeder in a state where the maintenance cover is detached from the sheet feeder in the embodiment according to one or more aspects of the present invention.
Figure 5:
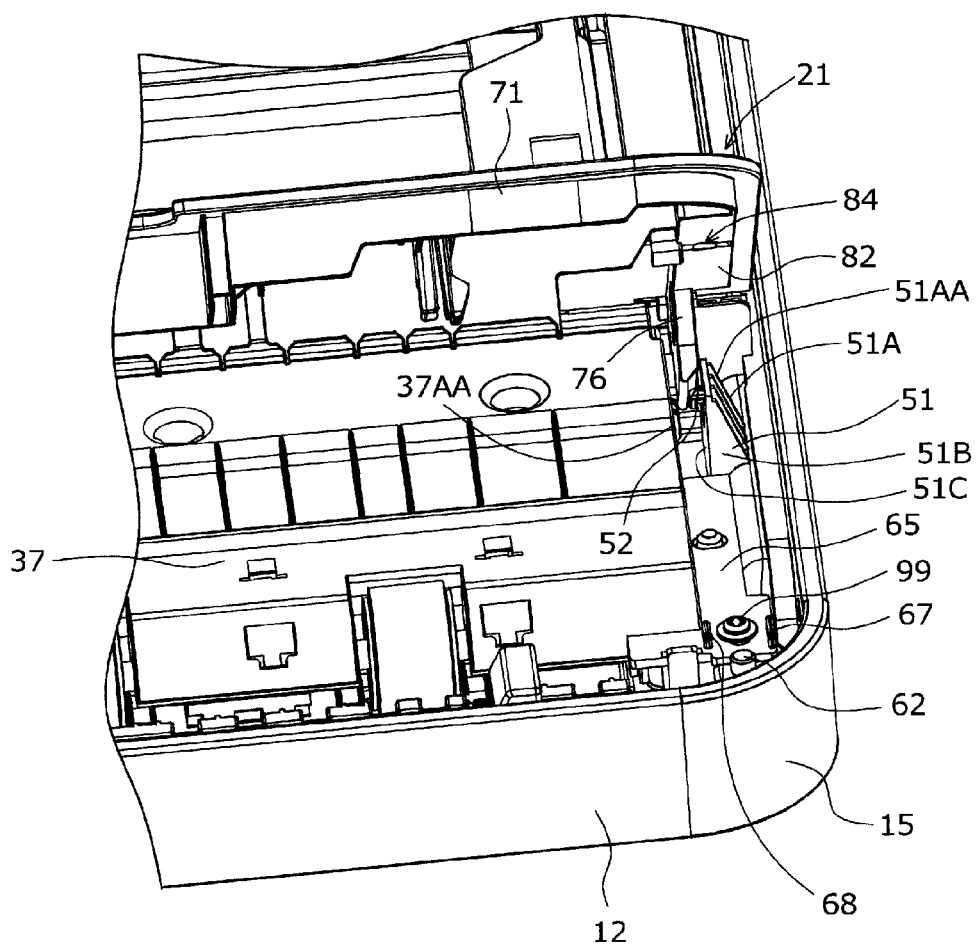
FIG. 5 is a perspective view, from an upper left side, of a left front end portion of the sheet feeder in a state where a connecting band is detached from the sheet feeder, and the maintenance cover is opened to such a position as to contact a housing in the embodiment according to one or more aspects of the present invention.

As shown in FIGS. 3 and 5, the opening-closing restriction portion 51 is disposed on a left side of the rotational shaft stand 42, between the front plate 11 and the guide member 37A. As shown in FIG. 5, the opening-closing restriction portion 51 extends upward on the bottom plate 41. The opening-closing restriction portion 51 includes an inclined surface 51A, a triangle surface 51B, and a standing wall 51C. The inclined surface 51A is inclined to become lower frontward. The inclined surface 51A is provided with a plurality of ribs 51AA. The plurality of ribs 51AA are configured to reduce a deformation amount of the standing wall 51C. The triangle surface 51B is formed in a right-triangle shape having a right angle on a rear side, when viewed from a left side. The opening-closing restriction portion 51 has, on a right side, a triangle surface substantially identical to the triangle surface 51B. The standing wall 51C is formed in a rectangular shape extending upward from the bottom plate 41. The standing wall 51C is disposed in front of the rib 37AA of the guide member 37A. Thus, the opening-closing restriction portion 51, when viewed from the left side, has a substantially triangle shape to taper upward. Such a substantially triangle shape of the opening-closing restriction portion 51 enhances a mechanical strength of the opening-closing restriction portion 51.

The restriction projection 52 is disposed on the standing wall 51C that is a rear surface of the opening-closing restriction portion 51. The restriction projection 52 protrudes rearward from the opening-closing restriction portion 51. The restriction projection 52 is formed integrally with the opening-closing restriction portion 51. An upper surface of the restriction projection 52 is inclined to become higher leftward (i.e., inclined such that a left end of the upper surface is higher than a right end thereof).

As shown in FIGS. 3 and 4, the first base stand 61 is disposed at a left front end inside the housing 2. The first base stand 61 is formed in a cuboid shape. The first base stand 61 includes a first base portion 61A and a second base portion 61B. The first base portion 61A is larger than the second base portion 61B in the vertical direction. Accordingly, a step 61C (height difference) is formed between the first base portion 61A and the second base portion 61B.

The protrusion 62 is disposed on an upper surface of the first base stand 61. The protrusion 62 is formed in a cylindrical shape to protrude upward from the upper surface of the first base stand 61.

As shown in FIG. 4, the screw hole 63 is formed in the upper surface of the first base stand 61. The screw hole 63 is located on a right side of the protrusion 62.

The supporting stand 64 is disposed between the opening-closing restriction portion 51 and the first base stand 61 in the left-to-right direction, between the front plate 11 and the guide member 37A in the front-to-rear direction. The supporting stand 64 protrudes upward from the bottom plate 41. An upper surface of the supporting stand 64 is on the same level as an upper surface of the second base portion 61B of the first base stand 61.

The second base stand 65 is supported by the first base stand 61 and the supporting stand 64 in a manner as shown in FIGS. 4 and 5. The second base stand 65 has a plate shape. The second base stand 65 is configured to bridge a distance between the second base stand 61 and the supporting stand 64.

As shown in FIG. 4, the through hole 66 is formed on an upper side of the screw hole 63, on the upper surface of the second base stand 65.

The rib-shaped wall portions 67 and 68 are disposed on both sides of the through hole 66, respectively, on the second base stand 65. The wall portions 67 and 68 extend in parallel with each other along the left-to-right direction.

<Configuration of Maintenance Cover>

Figure 6:
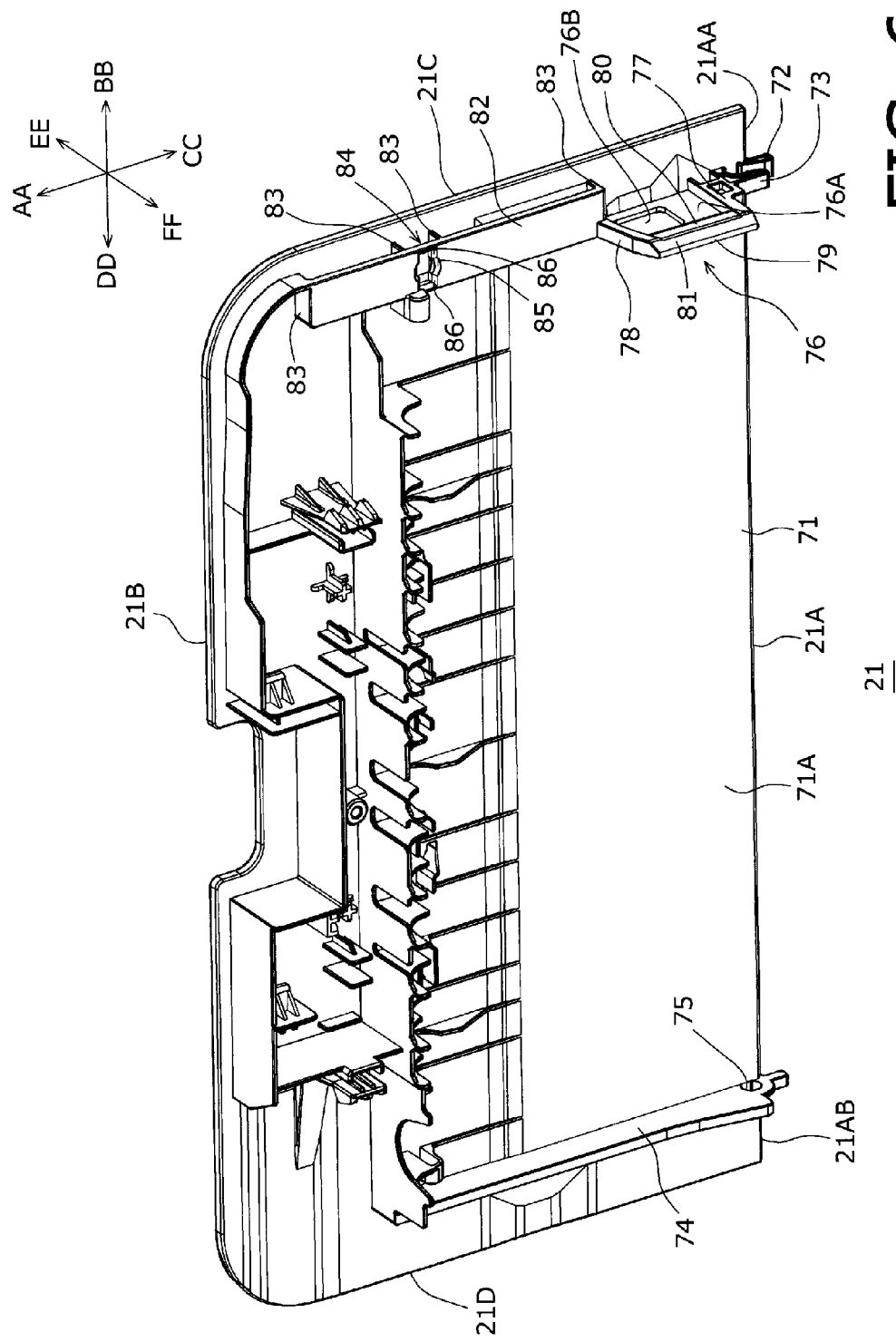
FIG. 6 is a perspective view showing an inner surface of the maintenance cover in the embodiment according to one or more aspects of the present invention.

The maintenance cover 21 is a single-piece product made by integral molding of polystyrene. As shown in FIG. 6, the maintenance cover 21 includes a cover main body 71, a first claw portion 72, a second claw portion 73, a rib 74, a contact portion 76, and a strip-shaped portion 82.

In the following descriptions, an AA direction (a direction toward an AA side), a BB direction (a direction toward a BB side), a CC direction (a direction toward a CC side), a DD direction (a direction toward a DD side), an EE direction (a direction toward an EE side), and an FF direction (a direction toward an FF side) shown in FIG. 6 are used to describe a configuration of the maintenance cover 21. The AA direction is a leftward direction of the maintenance cover 21 which is attached to the housing 2 and in a closed state. The BB direction is a frontward direction of the maintenance cover 21 which is attached to the housing 2 and in the closed state. The CC direction is a rightward direction of the maintenance cover 21 which is attached to the housing 2 and in the closed state. The DD direction is a rearward direction of the maintenance cover 21 which is attached to the housing 2 and in the closed state. The EE direction is an upward direction of the maintenance cover 21 which is attached to the housing 2 and in the closed state. The FF direction is a downward direction of the maintenance cover 21 which is attached to the housing 2 and in the closed state.

The cover main body 71 is formed substantially in a rectangular plate shape having a longitudinal direction along the front-to-rear direction.

As shown in FIGS. 4 and 6, the first claw portion 72 is disposed at a left front end on the inner surface 71A of the cover main body 71. The first claw portion 72 extends in the FF direction from the inner surface 71A of the cover main body 71, and then bends and extends in the CC direction.

As shown in FIG. 6, the second claw portion 73 is disposed on the inner surface 71A of the cover main body 71. The second claw portion 73 extends in the FF direction from a position away in the AA direction from a base end of the first claw portion 72, and then bends and extends in the CC direction. Between the first claw portion 72 and the second claw portion 73, there is a gap substantially as long as a dimension of the rotational shaft portion 43 of the housing 2 in a direction perpendicular to a central axis of the rotational shaft portion 43.

The rib 74 is disposed at an end in the DD direction on the inner surface 71A of the cover main body 71. The rib 74 extends in the FF direction from the inner surface 71A of the cover main body 71. The rib 74 extends in parallel with a rear end 21D of the cover main body 71. The rib 74 has a circular shaft insertion hole 75 provided at an end in the CC direction. The shaft insertion hole 75 faces, in the BB-DD direction, a space between the base end of the first claw portion 72 and the base end of the second claw portion 73.

The contact portion 76 is disposed on the inner surface 71A of the cover main body 71. The contact portion 76 is provided integrally with a first supporting portion 77, a second supporting portion 78, a joint portion 79, and a plate portion 76A.

The first supporting portion 77 extends in the FF direction from a position on the AA side of the second claw portion 73.

The second supporting portion 78 extends in the FF direction from a position on the AA side of the first supporting portion 77.

The joint portion 79 extends in the AA-CC direction so as to bridge a distance between a distal end of the first supporting portion 77 and a distal end of the second supporting portion 78. The joint portion 79 has a first inclined surface 80 and a second inclined surface 81. The first inclined surface 80 is inclined to become closer to the BB side toward its FF-side end. The second inclined surface 81 is continuous with the FF-side end of the first inclined surface 80. The second inclined surface 81 is inclined to become closer to the DD side toward its FF-side end.

The plate portion 76A is surrounded by the first supporting portion 78, the joint portion 79, and the inner surface 71A of the cover main body 71. The plate portion 76A is formed in a plate shape extending in the AA-CC direction and the EE-FF direction. The plate portion 76A is provided with a hole 76B, which penetrates the plate portion 76A in the BB-DD direction.

The strip-shaped portion 82 is disposed on the side of the inner surface 71A of the cover main body 71. The strip-shaped portion 82 is parallel to the inner surface 71A of the cover main body 71 with a predetermined distance therebetween. The strip-shaped portion 82 extends in the AA direction from a base end of the second supporting portion 78. Between the cover main body 71 and the strip-shaped portion 82, a plurality of supporting portions 83 are formed to support the strip-shaped portion 82.

The strip-shaped portion 82 is provided with an engagement hole 84 on the AA side with respect to a center of the strip-shaped portion 82 in the AA-CC direction. The engagement hole 84 is formed to penetrate the strip-shaped portion 82. The engagement hole 84 includes a hole center portion 85 and hole extension portions 86. The hole center portion 85 has a circular shape. The hole extension portions 86 are formed in rectangular shapes extending in the BB direction and the DD direction, respectively, from the hole center portion 85.

<Attaching Maintenance Cover to Housing>

Hereinafter, a procedure for attaching the maintenance cover 21 to the housing 2 will be described. First, the rotational shaft portion 44 of the housing 2 is inserted, from behind, into the shaft insertion hole 75 of the maintenance cover 21. Next, the maintenance cover 21 is put into a posture where the maintenance cover 21 extends upward, and the rotational shaft portion 43 of the housing 2 is inserted between the first claw portion 72 and the second claw portion 73. Thereby, the maintenance cover 21 is attached to the housing 2 so as to be rotatable (openable and closeable) around the rotational shaft portions 43 and 44 with respect to the housing.

<Opening and Closing Maintenance Cover>

When the maintenance cover 21 is rotated such that the left end 21B thereof is moved further rightward from the posture for the maintenance cover 21 to be attached to the housing 2, i.e., the posture where the maintenance cover 21 extends upward, a right front end 21AA of the maintenance cover 21 comes into contact with an upper surface 42A of the rotational shaft stand 42 from above. Further, a left front end 21AB of the maintenance cover 21 comes into contact with restriction inclined surface 2A. Thereby, the maintenance cover 21 is restricted from being opened any more. The restriction inclined surface 2A is disposed on a rear side of the guide member 37A. The restriction inclined surface 2A has an upper surface inclined to become higher toward a right end thereof. By the inclined upper surface, the restriction inclined surface 2A is allowed to smoothly slide in contact with the left front end 21AB of the maintenance cover 21 and restrict the maintenance cover 21 from make further rotation.

Afterward, when the maintenance cover 21 is rotated to be closed, the second inclined surface 81 of the joint portion 79 of the maintenance cover 21 comes into contact with the restriction projection 52 of the housing 2 from above. Thereby, the maintenance cover 21 is supported by the restriction projection 52. Accordingly, as shown in FIG. 2, the maintenance cover 21 is held in a position where the maintenance cover 21 is open to form a predetermined angle with respect to the upper surface of the housing 2 even in such a state that the maintenance cover 21 is not held by a user's hand. It is noted that a front end 21C, the second inclined surface 81, and the upper surface of the restriction projection 52 of the maintenance cover 21 are substantially parallel to each other.

When the maintenance cover 21 is pressed downward from the above position, the first supporting portion 77 and the second supporting portion 78 of the maintenance cover 21 are elastically deformed. Thereby, the second inclined surface 81 slides in contact with the restriction projection 52. Then, the contact portion 76 is pinched between the rib 37AA of the guide member 37A and the restriction projection 52. By the pinching, the maintenance cover 21 is held in the position where the maintenance cover 21 is open to form the predetermined angle with respect to the upper surface of the housing 2 even in such a state that the maintenance cover 21 is not held by a user's hand. Then, when the maintenance cover 21 is pressed further downward, the restriction projection 52 is pulled out of the second inclined surface 81. When the restriction projection 52 is pulled out of the second inclined surface 81, the first supporting portion 77 and the second supporting portion 78 are restored into their respective original shapes. When the first supporting portion 77 and the second supporting portion 78 are restored into their respective original shapes, the state of the maintenance cover 21 held by the restriction projection 52 is released. Afterward, even when a user's hand is disengaged from the maintenance cover 21, the maintenance cover 21 is rotated by its own weight to a position to close the upper side of the housing 2. It is noted that the hole 76B of the contact portion 76 is configured to prevent a risk that, after the maintenance cover 21 is closed, due to contact between the rib 37AA and the plate portion 76A, the maintenance cover 21 might be put into a misaligned state such as a state where a rear end of the maintenance cover 21 is not aligned with the rear plate 12.

Meanwhile, when the maintenance cover 21 is opened from the closed state, in response to rotation of the maintenance cover 21, the first inclined surface 80 of the joint portion 79 of the maintenance cover 21 comes into contact with the restriction projection 52 of the housing 2 from beneath. When the maintenance cover 21 is further opened, the restriction projection 52 slides in contact with the first inclined surface 80, and the first supporting portion 77 and the second supporting portion 78 of the maintenance cover 21 are elastically deformed. Then, when the restriction projection 52 is pulled out of the first inclined surface 80, the first supporting portion 77 and the second supporting portion 78 are restored into their respective original shapes. Afterward, when a user's hand is disengaged from the maintenance cover 21, the second inclined surface 81 of the joint portion 79 comes into contact with the restriction projection 52 from above, and the maintenance cover 21 is supported by the restriction projection 52. Accordingly, the maintenance cover 21 is held in the position where the maintenance cover 21 is open to form the predetermined angle with respect to the upper surface of the housing 2.

The sheet feeder 1 includes a connecting band 91 configured to connect the housing 2 with the maintenance cover 21 so as to restrict the angle between the maintenance cover 21 in the open state and the upper surface of the housing.

Figure 7:
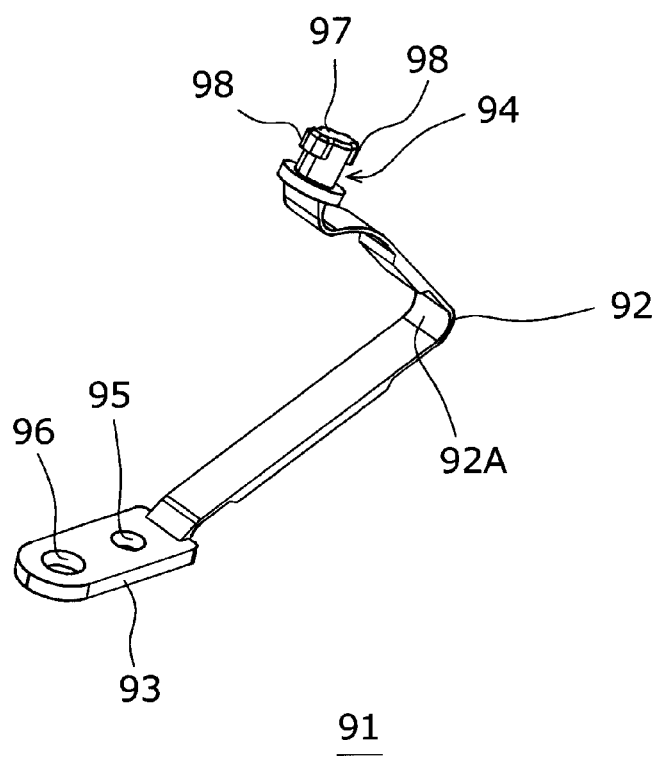
FIG. 7 is a perspective view showing the connecting band in the embodiment according to one or more aspects of the present invention.

The connecting band 91 is made of polypropylene. As shown in FIG. 7, the connecting band 91 is provided integrally with a band main body 92, a screw engagement portion 93, and an engagement projection 94. It is noted that the contact portion 76 of the maintenance cover 21 and the opening-closing restriction portion 51 of the housing 2 are made of polystyrene. In general, the polystyrene has a higher strength against repeated deformation than that of the polypropylene. In the embodiment, since the maintenance cover 21 is held in the open state by the contact between the contact portion 76 and the opening-closing restriction portion 51, it is possible to reduce deformation of the connecting band 91. Further, it is easy to reinforce the opening-closing restriction portion 51, e.g., by providing the opening-closing restriction portion 51 with reinforcing ribs such as the ribs 51AA and forming the opening-closing restriction portion 51 in a triangle shape in a side view. Accordingly, it is easier to enhance the strength of the opening-closing restriction portion 51 than to enhance the strength of the connecting band 91. Therefore, since the maintenance cover 21 is held in the open state by the contact between the contact portion 76 and the opening-closing restriction portion 51, it is possible to reduce fatigue and deformation of the connecting band 91.

Figure 8:
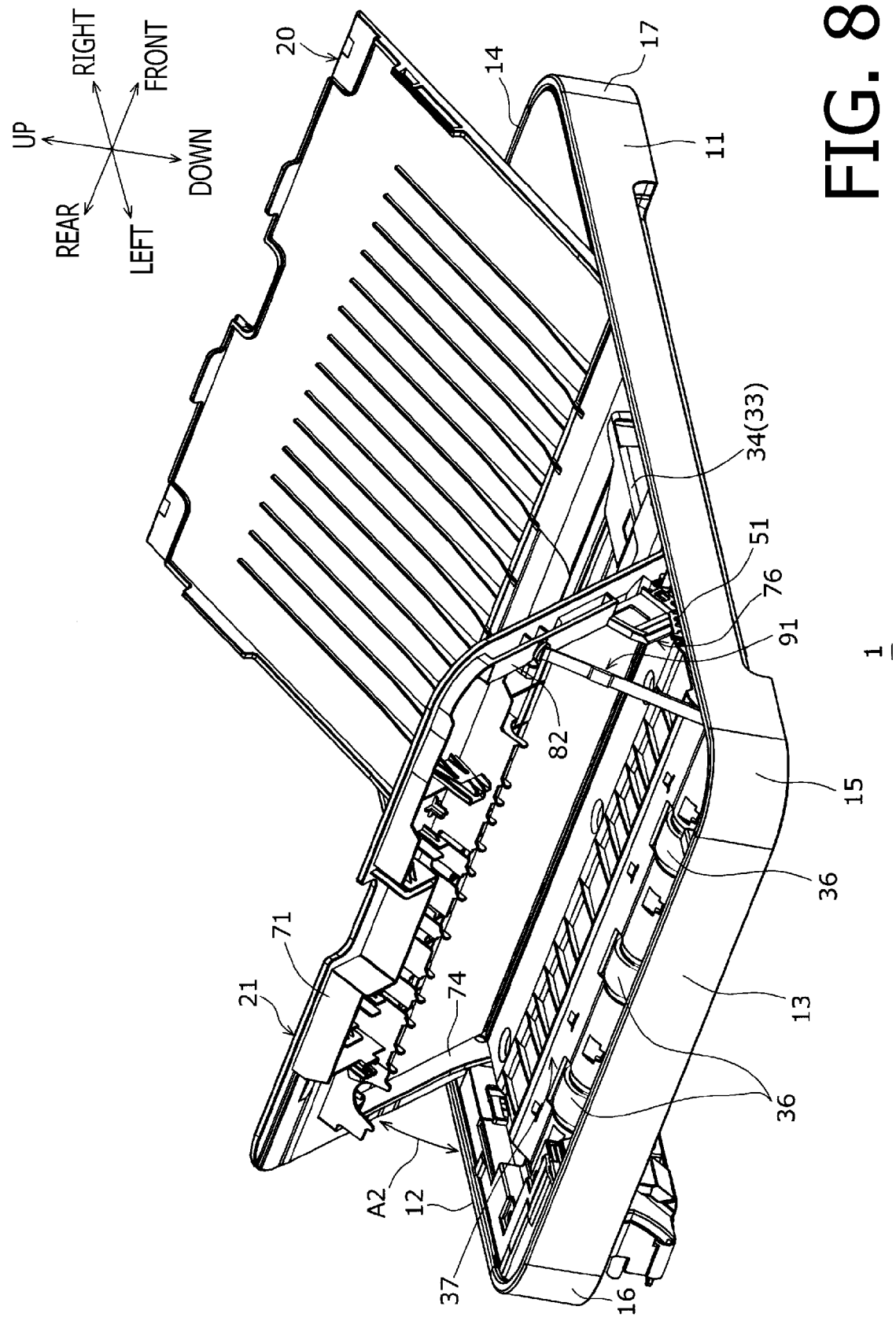
FIG. 8 is a perspective view, from the upper left front side, of the sheet feeder in a state where the maintenance cover is open, and the connecting band is fully stretched in the embodiment according to one or more aspects of the present invention.

The band main body 92 is formed in an elongated thin band shape. The band main body 92 is configured to be bent in a state where a middle portion 92A thereof is bent as shown in FIG. 7 and to be stretched in a state where the middle portion 92A is stretched as shown in FIG. 8. An angle A2 formed between the maintenance cover 21 and the upper surface of the housing 2 when the band main body 92 is fully stretched is greater than an angle A1 between the maintenance cover 21, which is supported by the restriction projection 52, and the upper surface of the housing 2. Accordingly, as shown in FIG. 2, when the maintenance cover 21 is supported by the restriction projection 52, the middle portion 92A of the band main body 92 is bent. In this state, the maintenance cover 21 is not held by the band main body 92. Thus, no load is applied to the band main body 92.

The screw engagement portion 93 is formed at an end of the band main body 92. The screw engagement portion 93 is formed in a plate shape having a longitudinal direction along an extending direction of the band main body 92. A circular screw insertion hole 95 is formed at an end, closer to the band main body 92, of the screw engagement portion 93. The screw insertion hole 95 has a diameter that is substantially as large as the screw hole 63 of the first base stand 61 of the housing 2. In addition, a circular positioning hole 96 is formed at an end, farther from the band main body 92, of the screw engagement portion 93. The positioning hole 96 has a diameter that is slightly larger than an outer diameter of the protrusion 62 of the first base stand 61 of the housing 2.

The engagement projection 94 is formed at another end of the band main body 92. The engagement projection 94 includes a cylindrical boss 97, and two engagement portions 98 extending from a circumferential surface of the boss 97. The boss 97 has an outer diameter that is slightly smaller than a diameter of the hole center portion 85 of the engagement hole 84 of the maintenance cover 21. The two engagement portions 98 are disposed 180 degrees away from each other with respect to the boss 97 (the two engagement portions 98 are disposed to face each other across the boss 97). Each engagement portion 98 is formed in a cuboid shape having such a size as to pass through one of the hole extension portions 86 of the engagement hole 84 of the maintenance cover 21.

The connecting band 91 is attached to the housing 2 before the maintenance cover 21 is attached to the housing 2.

When the connecting band 91 is attached to the housing 2, as shown in FIG. 3, the screw engagement portion 93 of the connecting band 91 is disposed to straddle the first base stand 61 and the second base stand 65 of the housing 2. At this time, the protrusion 62 of the first base stand 61 is inserted into the positioning hole 96 of the screw engagement portion 93. Thereby, the screw engagement portion 93 is positioned with respect to the housing 2. Further, the screw engagement portion 93 is disposed between the wall portions 67 and 68 of the second base stand 65. Thereby, the screw engagement portion 93 is positioned with respect to the housing 2. Namely, by the wall portions 67 and 68, the screw engagement portion 93 is restricted from turning around the protrusion 62.

By the above positioning of the screw engagement portion 93, the screw insertion hole 95 is placed on the through hole 66 of the second base stand 65 so as to be positionally coincident with the through hole 66 when viewed from above. Then, as shown in FIG. 4, a screw 99 is inserted into the screw insertion hole 95 and the through hole 66, and a tip of the screw 99 is installed into the screw hole 63. Thereby, the screw engagement portion 93 is attached to the housing 2 by the installation of the screw 99.

After the maintenance cover 21 is attached to the housing 2, the connecting band 91 is attached to the maintenance cover 21.

When the connecting band 91 is attached to the maintenance cover 21, the connecting band 91 is twisted by 90 degrees in such a manner that the engagement portions 98 of the engagement projection 94 of the connecting band 91 are positionally coincident with the hole extension portions 86 of the engagement hole 84 of the maintenance cover 21. Thereafter, the engagement projection 94 is inserted into the engagement hole 84. Then, when a user's hand is disengaged from the connecting band 91, the connecting band 91 is restored to a state before being twisted. The engagement portions 98 come into contact with a surrounding portion of the hole center portion 85 of the strip-shaped portion 82 of the housing 2. The engagement projection 94 is engaged with the strip-shaped portion 82.

Thereby, attachment of the connecting band 91 to the housing 2 and the maintenance cover 21 is accomplished.

<Operations and Advantageous Effects>

As described above, the maintenance cover 21 is rotatable around the rotational shaft portions 43 and 44 with respect to the housing 2. By the connecting band 91, the housing 2 is connected with the maintenance cover 21. Therefore, a rotatable range of the maintenance cover 21 with respect to the housing 2 is restricted, and thus, it is possible to prevent the maintenance cover 21 from being excessively opened beyond the rotatable range. Consequently, it is possible to prevent the housing 2 or the maintenance cover 21 from being damaged due to the maintenance cover 21 being excessively opened.

The maintenance cover 21 is provided with the contact portion 76. The housing 2 is provided with the opening-closing restriction portion 51. When the maintenance cover 21 is opened, the opening-closing restriction portion 51 comes into contact with the contact portion 76, such that the maintenance cover 21 is held in the open state. Thereby, when a user performs maintenance for the inside of the housing 2, the user is allowed to easily do the maintenance without having to hold the maintenance cover 21 by his/her hand.

Further, no load is applied to the connecting band 91 in order to hold the maintenance cover 21 in the open state. Therefore, it is possible to reduce fatigue of the connecting band 91. Moreover, the contact portion 76 of the maintenance cover 21 and the opening-closing restriction portion 51 of the housing 2 are made of polystyrene. The connecting band 91 is made of polypropylene. In general, polystyrene has a higher strength against repeated deformation than that of the polypropylene. Accordingly, as the maintenance cover 21 is held in the open state by the contact between the contact portion 76 and the opening-closing restriction portion 51, it is possible to reduce deformation of the connecting band 91. Additionally, it is easy to reinforce the opening-closing restriction portion 51, e.g., by providing the opening-closing restriction portion 51 with reinforcing ribs such as the ribs 51AA and forming the opening-closing restriction portion 51 in a triangle shape in a side view. Accordingly, it is easier to enhance the strength of the opening-closing restriction portion 51 than to enhance the strength of the connecting band 91. Therefore, as the maintenance cover 21 is held in the open state by the contact between the contact portion 76 and the opening-closing restriction portion 51, it is possible to reduce fatigue and deformation of the connecting band 91.

The connecting band 91 includes the screw engagement portion 93, the engagement projection 94, and the band main body 92 between the screw engagement portion 93 and the engagement projection 94. The band main body 92 is bent when the opening-closing restriction portion 51 contacts the contact portion 76. Further, the band main body 92 is linearly stretched when the maintenance cover 21 is widely opened.

When the band main body 92 is linearly stretched, the maintenance cover 21 is not allowed to be opened any more. Consequently, it is possible to prevent the housing 2 or the maintenance cover 21 from being damaged due to the maintenance cover 21 being excessively opened.

When the maintenance cover 21 is closed with respect to the housing 2, the left end of the maintenance cover 21 is along the left end of the housing 2, and the rotational axis (AX2) of the maintenance cover 21 is disposed on the right side of the left end of the housing 2. When the maintenance cover 21 is opened beyond the rotatable range of the maintenance cover 21 restricted by the connecting band 91, the right front portion of the cover main body 71 of the maintenance cover 21 comes into contact with the rotational shaft portion 43 from the right side. Thereby, the maintenance cover 21 is restricted from being opened any more. In other words, when the cover main body 71 of the maintenance cover 21 contacts the rotational shaft portion 43, the rotational shaft portion 43 serves as a stopper configured to prevent further rotation of the maintenance cover 21.

Since the maintenance cover 21 is prevented from being further rotated, it is possible to prevent the maintenance cover 21 from being excessively opened and prevent the maintenance cover 21 or the housing 2 from being damaged.

The rotational shaft portion 43, and the first claw portion 72 and the second claw portion 73 between which the rotational shaft portion 43 is inserted are disposed to face the rotational shaft portion 44 and the shaft insertion hole 75 into which the rotational shaft portion 44 is inserted, across the guide member 37A in the front-to-rear direction.

Thereby, it is possible to disperse loads caused when the maintenance cover 21 is opened and closed on various elements such as the rotational shaft portion 43, the first claw portion 72, the second claw portion 73, the rotational shaft portion 44, and the shaft insertion hole 75. Thus, it is possible to prevent damages of the rotational shaft portion 43, the rotational shaft portion 44, the first claw portion 72, the second claw portion 73, and the rib 74 in which the shaft insertion hole 75 is formed.

Further, it is possible to prevent a sheet being conveyed on the guide member 37A from colliding against the rotational shaft portion 43, the rotational shaft portion 44, the first claw portion 72, the second claw portion 73, or the rib 74.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations about the same configurations as exemplified in the aforementioned embodiment will be omitted.

[Modifications]

The cover opening-closing mechanism according to aspects of the present invention may be applied to apparatuses or devices other than the sheet feeder 1.

In the aforementioned embodiment, the housing 2 and the maintenance cover 21 are made of polystyrene. However, the housing 2 and the maintenance cover 21 may be made of acrylonitrile butadiene styrene (ABS) or polycarbonate.

In the aforementioned embodiment, the connecting band 91 is made of polypropylene. However, the connecting band 91 may be made of elastic resin other than polypropylene.

What is claimed is:

1. A cover opening-closing mechanism configured to allow a cover to rotate around a rotational axis with respect to a housing, between an opened position and a closed position, the cover opening-closing mechanism comprising:
    a connecting member configured to connect the housing with the cover and to define the opened position by restricting a degree of opening between the housing and the cover;
    a first contact portion disposed at the cover; and
    a second contact portion disposed at the housing, the second contact portion configured to maintain, in at least a vertical direction, the cover in a hold position by contacting the first contact portion of the cover, wherein the hold position is an intermediate position between the closed position and the opened position,
    wherein the cover, when in the closed position relative to the housing, extends in an extending direction perpendicular to the rotational axis,
    wherein an end of the cover, in the closed position, on a specific side in the extending direction is disposed along an end of the housing on the specific side in the extending direction,
    wherein the rotational axis is disposed on an opposite side of the end of the housing in the extending direction, and
    wherein the housing comprises a stopper configured to contact the cover when the cover is opened beyond a rotatable range of the cover restricted by the connecting member and to prevent the cover from being further opened.

2. The cover opening-closing mechanism according to claim 1,
    wherein the connecting member comprises:
        a first portion disposed at an end of the connecting member, the first portion configured to engage with the housing;
        a second portion disposed at a different end of the connecting member, the second portion configured to engage with the cover; and
        a middle portion disposed between the first portion and the second portion, the middle portion configured to be bent when the cover is in the hold position relative to the housing and to be linearly stretched when the cover is further opened to the opened position from the hold position relative to the housing, and
    wherein an angle between the cover in the opened position and the housing is greater than an angle between the cover in the hold position and the housing.

3. The cover opening-closing mechanism according to claim 2,
    wherein the first portion of the connecting member is disposed farther from the rotational axis of the cover than the second contact portion in a first direction, the first direction being perpendicular to the rotational axis and defined with respect to the housing, and
    wherein the second portion of the connecting member is disposed farther from the rotational axis than the first contact portion in a second direction, is the second direction being perpendicular to the rotational axis and defined with respect to the cover.

4. The cover opening-closing mechanism according to claim 1, further comprising:
    a rotational shaft extending along the rotational axis, the rotational shaft disposed at one of the cover and the housing; and
    a shaft supporter disposed at the other one of the cover and the housing, the shaft supporter configured to rotatably support the rotational shaft.

5. The cover opening-closing mechanism according to claim 4,
    wherein the rotational shaft comprises two rotational shaft portions facing and spaced from each other in a direction parallel to the rotational axis, and
    wherein the shaft supporter comprises two shaft supporting portions facing and spaced apart from each other in the direction parallel to the rotational axis, the two shaft supporting portions configured to rotatably support the two rotational shaft portions, respectively.

6. A cover opening-closing mechanism comprising:
    a rotational shaft extending along an axis line, the rotational shaft disposed at one of a cover and a housing, the rotational shaft configured to move the cover between a closed position and an opened position;
    a shaft supporter disposed at the other one of the cover and the housing, the shaft supporter configured to support the rotational shaft so as to allow the cover to rotate around the axis line with respect to the housing;
    a first contact portion disposed at the cover;
    a second contact portion disposed at the housing, the second contact portion configured to maintain, at least in a vertical direction, the cover in a hold position relative to the housing by contacting the first contact portion of the cover, the hold position being an intermediate position between the opened position and the closed position; and
    a connecting member configured to connect the housing with the cover so as to restrict a rotatable range of the cover with respect to the housing in the opened position, the connecting member comprising a bendable portion configured to bend when the cover is in the hold position relative to the housing and to be linearly stretched when the cover is further opened to the opened position from the hold position relative to the housing,
    wherein the cover, in the closed position relative to the housing, extends in an extending direction perpendicular to the rotational axis,
    wherein an end of the cover in the closed position on a specific side in the extending direction is along an end of the housing on the specific side in the extending direction,
    wherein the rotational axis is disposed on an opposite side of the end of the housing in the extending direction, and
    wherein the housing comprises a stopper configured to contact the cover when the cover is opened beyond the range of opening of the cover restricted by the connecting member and to prevent the cover from being further opened.

7. A sheet feeder comprising:
a sheet feeding mechanism configured to feed and convey a sheet through a sheet conveyance path;
a housing configured to accommodate the sheet feeding mechanism;
a cover; and
a cover opening-closing mechanism configured to allow the cover to rotate around a rotational axis with respect to the housing between an opened position and a closed position, the cover opening-closing mechanism comprising:
  a connecting member configured to connect the housing with the cover and to restrict a range of opening of the cover in the opened position;
  a first contact portion disposed at the cover; and
  a second contact portion disposed at the housing, the second contact portion configured to maintain, in at least a vertical direction, the cover in a hold position relative to the housing by contacting the first contact portion of the cover,
wherein the cover, in the closed position relative to the housing, extends in an extending direction perpendicular to the rotational axis,
wherein an end of the cover in the closed position on a specific side in the extending direction is along an end of the housing on the specific side in the extending direction,
wherein the rotational axis is disposed on an opposite side of the end of the housing in the extending direction, and
wherein the housing comprises a stopper configured to contact the cover when the cover is opened beyond the range of opening of the cover restricted by the connecting member and to prevent the cover from being further opened.

8. The sheet feeder according to claim 7,
wherein the connecting member comprises:
  a first portion disposed at an end of the connecting member, the first portion configured to engage with the housing;
  a second portion disposed at a different end of the connecting member, the second portion configured to engage with the cover; and
  a middle portion disposed between the first portion and the second portion, the middle portion configured to bend when the cover is in the hold position relative to the housing and to be linearly stretched when the cover is further opened to the opened position from the hold position relative to the housing, and
wherein an angle between the cover in the opened position and the housing is greater than an angle between the cover in the hold position and the housing.

9. The sheet feeder according to claim 8,
wherein the first portion of the connecting member is disposed farther from the rotational axis than the second contact portion in a first direction, the first direction being perpendicular to the rotational axis and defined with respect to the housing, and
wherein the second portion of the connecting member is disposed farther from the rotational axis than the first contact portion in a second direction, the second direction being perpendicular to the rotational axis and defined with respect to the cover.

10. The sheet feeder according to claim 7,
wherein the cover opening-closing mechanism further comprises:
  a rotational shaft extending along the rotational axis, the rotational shaft disposed at one of the cover and the housing; and
  a shaft supporter disposed at a different one of the cover and the housing, the shaft supporter configured to rotatably support the rotational shaft.

11. The sheet feeder according to claim 10,
wherein the rotational shaft comprises two rotational shaft portions disposed to face each other across a distance in a direction parallel to the rotational axis, and
wherein the shaft supporter comprises two shaft supporting portions disposed to face each other across a distance in the direction parallel to the rotational axis, the two shaft supporting portions configured to rotatably support the two rotational shaft portions, respectively.

12. The sheet feeder according to claim 11,
wherein the two rotational shaft portions are disposed to face each other across the sheet conveyance path in the direction parallel to the rotational axis, and
wherein the two shaft supporting portions are disposed to face each other across the sheet conveyance path in the direction parallel to the rotational axis.

13. The sheet feeder according to claim 12,
wherein the first contact portion and the second contact portion are disposed out of the sheet conveyance path in a direction parallel to the rotational axis.

14. The sheet feeder according to claim 7,
wherein the first contact portion and the second contact portion are disposed out of the sheet conveyance path in a direction parallel to the rotational axis.

* * * * *